United States Patent
Miller, II et al.

(10) Patent No.: US 11,341,382 B1
(45) Date of Patent: May 24, 2022

(54) EVALUATION OF PRINT VERIFICATION SYSTEM

(71) Applicants: Phillip Eugene Miller, II, Boulder, CO (US); Carl Michael Dennison, Firestone, CO (US)

(72) Inventors: Phillip Eugene Miller, II, Boulder, CO (US); Carl Michael Dennison, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/220,917

(22) Filed: Apr. 1, 2021

(51) Int. Cl.
*G06K 15/02* (2006.01)
*H04N 1/00* (2006.01)

(52) U.S. Cl.
CPC ....... *G06K 15/1836* (2013.01); *G06K 15/025* (2013.01); *H04N 1/00034* (2013.01); *H04N 1/00037* (2013.01); *H04N 1/00039* (2013.01); *H04N 1/00058* (2013.01); *H04N 1/00074* (2013.01)

(58) Field of Classification Search
CPC ........... H04N 1/00005; H04N 1/00015; H04N 1/00029; H04N 1/00031; H04N 1/00034; H04N 1/00037; H04N 1/00039; H04N 1/00045; H04N 1/00058; H04N 1/00068; H04N 1/00074; H04N 1/409; H04N 1/58; G06K 15/025; G06K 15/027; G06F 3/1208; G06F 3/121; G06F 3/1234
See application file for complete search history.

(56) References Cited

U.S. PATENT DOCUMENTS

| | | | |
|---|---|---|---|
| 8,472,073 B2 | 6/2013 | Dennison | |
| 8,804,157 B2 | 8/2014 | Bockus et al. | |
| 8,964,192 B2 * | 2/2015 | LeCostaouec | H04N 1/00029 358/1.13 |
| 9,507,547 B1 * | 11/2016 | Dennison | G06K 9/2063 |
| 10,715,683 B2 | 7/2020 | Xiao et al. | |
| 10,795,618 B2 * | 10/2020 | Gutierrez | G06K 15/1822 |
| 2006/0236294 A1 | 10/2006 | Saidin et al. | |
| 2007/0291289 A1 | 12/2007 | Kuo et al. | |
| 2014/0056484 A1 | 2/2014 | Lotz et al. | |

FOREIGN PATENT DOCUMENTS

JP 2014069499 A 4/2014

OTHER PUBLICATIONS

Shankar et al; A real-time print-defect detection system for web offset printing; Elsevier Journal; Measurement 42 (2009) 645-652.

* cited by examiner

*Primary Examiner* — Scott A Rogers
(74) *Attorney, Agent, or Firm* — Duft & Bornsen, PC

(57) ABSTRACT

Systems and methods are provided for evaluation of a print verification system. One embodiment is a print system that includes a printer, a virtual printer, a print verification system, and a print server. The print server is configured to initiate an evaluation of the print verification system by providing a defective version of a print job to one of the printer and the virtual printer and providing a non-defective version of the print job to the other one of the printer and the virtual printer. The print server verifies functionality of the print verification system based on whether the print verification system detects the defects via comparison of the printed output of the print job by the printer against the bitmap image output of the print job by the virtual printer.

20 Claims, 7 Drawing Sheets

EVALUATION OF PRINT VERIFICATION SYSTEM

FIELD OF THE INVENTION

The invention relates to the field of printing, and in particular, to verifying the printed output of a printer.

BACKGROUND

Entities with substantial printing demands typically use a production printer. A production printer is a high-speed printer used for volume printing such as a continuous-forms printer that prints on a web of print media stored on a large roll. Some production print systems include a Print Verification System (PVS) that verifies that the printed pages from a printer are error-free. The PVS may scan the marked/printed pages of a job from a production printer, and compare each printed page to a corresponding rasterized version kept in memory. If there is a discrepancy, such as an errant droplet of ink, the PVS may identify the error and report it for handling by an operator of the printer.

Occasionally, the operator may want to verify that the PVS itself is functioning correctly. To test the PVS, a specially prepared test print job is run which contains errors deliberately inserted into a specially prepared print job. Unfortunately, the preparation of such a test print job involves tedious manual work. Additionally, the PVS must stop its normal operation and run in a test mode so that it can compare pages which have been reformatted into pairs and detect any differences, or errors, between a given pair. Unfortunately, this way of testing does not accurately reflect actual PVS production processing where each printed page is compared against a rasterized version of the same page. Users thus continue to desire enhancements that are capable of verifying the functionality and effectiveness of a PVS.

SUMMARY

Embodiments described herein describe evaluation of a Print Verification System (PVS). Verification that the PVS is correctly operating is performed using bitmap images that are generated external to the printer. The technique advantageously enables any print job to act as a test print job. Accordingly, the PVS does not need to be run in a test mode to test its accuracy and does not become tuned to a specially prepared print file using reformatted page pairs. Additionally, a print operator can be assured the PVS is able to detect defects in a file before actual production copies are printed, thus enabling the print operator to authorize new book formats even if the PVS has not previously encountered the format.

One embodiment is a print system that includes a printer configured to rasterize print jobs to produce first rasterized images, and to mark print media according to the first rasterized images to produce printed output, and a virtual printer configured to rasterize print jobs to produce second rasterized images, and to output the second rasterized images as bitmap image output. The print system also includes a print verification system configured to detect print errors by comparing the first rasterized images and the printed output. The print system further includes a print server configured to receive an instruction to perform an evaluation of the print verification system, to receive a print job including pages to be output by the printer, and to generate a defective version of the print job by inserting defects into pages of the print job to create defect pages. The print server is further configured to provide the defective version of the print job to one of the printer and the virtual printer, to provide a non-defective version of the print job to another of the printer and the virtual printer that is different than the one which received the defective version, and to verify functionality of the print verification system based on whether the print verification system detects the defects via comparison of the printed output of the print job by the printer against the bitmap image output of the print job by the virtual printer.

Another embodiment is a method of evaluating a print verification system. The method includes receiving an instruction to perform an evaluation of the print verification system, receiving a print job including pages to be output by a printer, and generating a defective version of the print job by inserting defects into pages of the print job to create defect pages. The method also includes providing the defective version of the print job to one of the printer and the virtual printer, and providing a non-defective version of the print job to another of the printer and the virtual printer that is different than the one which received the defective version. The method further includes verifying functionality of the print verification system based on whether the print verification system detects the defects via comparison of printed output of the print job by the printer against bitmap image output of the print job by the virtual printer.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
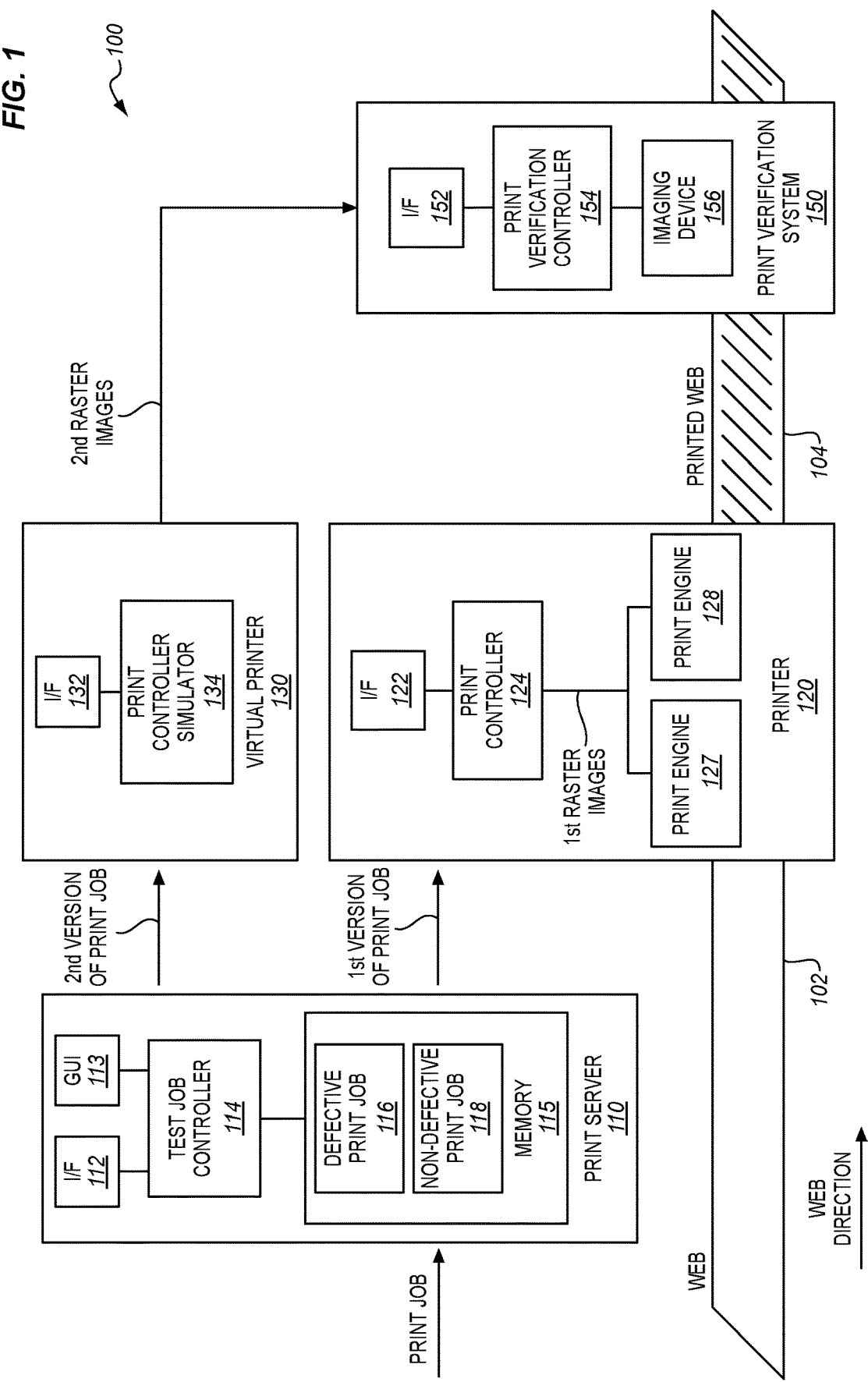
FIG. 1 is a diagram of a print system in an illustrative embodiment.

FIG. 1 is a diagram of a print system 100 in an illustrative embodiment. The print system 100 includes a print server 110, one or more printer(s) 120, and a print verification system (PVS) 150. In general, the print server 110 receives print jobs from users and schedules the print jobs with a printer 120 under its domain. The printer 120 marks a web of print media 102 (e.g., continuous-forms paper web) based on the incoming print data of the print job, resulting in a printed web 104. And, the PVS 150 verifies that print jobs have been printed correctly by comparing the printed web with rasterized pages of the print job. For example, the PVS 150 may detect errant droplets of ink (sometimes referred to as an "unintended black" defect) and areas where ink is not in its expected place (sometimes referred to as a "missing black" defect).

The printer includes an interface 122, a print controller 124, and one or more print engines 127-128. The printer 120 receives an incoming print job from the print server 110 via an interface 122, generates rasterized data for the print job with a print controller 124, and transmits the rasterized data for the print job to one or more print engines 127-128 which mark the print media 102 with the rasterized data. As shown in FIG. 1, the printer 120 may comprise a continuous-forms printer that applies marks to the print media 102. The applied marking material may comprise ink in the form of any suitable fluid (e.g., aqueous inks, oil-based paints, additive manufacturing materials, etc.) for marking the print media 102. The print controller 124 may also transmit a rasterized version of the print job to the PVS 150. For instance, as each logical page of a print job is rasterized, the print controller 124 may transmit those rasterized pages via the interface 122 to the PVS 150.

The PVS 150 includes an interface 152, a print verification controller 154, and one or more imaging device(s) 156. The interface 152 receives rasterized images of print jobs. The imaging device 156 may comprise a camera, scanner, densitometer, spectrophotometer or other suitable component for acquiring images of printed content. The print verification controller 154 compares images of the physical pages from the printed web 104 captured by the imaging device 156 with rasterized pages. The comparison enables the print verification controller 154 to determine whether there are any discrepancies that indicate a printing error on a printed page.

Current techniques for verifying that a PVS is functioning correctly involve creating a specially prepared test print job with manually inserted errors. The preparation of such a test print job is tedious and therefore print operators tend to use the same test print job repeatedly. As such, a PVS may become tuned to pass the specially prepared test print job, which can cause some unexpected defect conditions to remain untested. Moreover, a PVS typically has to stop its normal operation and run in a test mode so that it can compare pages which have been reformatted into pairs and detect any differences, or errors, between a given pair. Current techniques thus have several shortcomings and do not accurately reflect actual PVS production processing where each printed page is compared against a rasterized version of the same page.

The print system 100 is therefore enhanced to improve verification that the PVS 150 is functioning correctly. In particular, the print system 100 includes a virtual printer 130 which, in combination with the enhanced functionality of the print server 110, enables defects to be seeded into one version of the print job while another version of the print job remains intact. By using the virtual printer 130 to generate rasterized images apart from the actual printing done by the printer 120, the print server 110 may seed defects into a first version of a print job sent to the printer 120, and not seed defects into a second version of that print job sent to the virtual printer 130, or vice versa. The accuracy of the PVS 150 is therefore tested when the PVS 150 compares the rasterized image output by the virtual printer 130 and the printed web 104 output by the printer 120 to detect any differences.

Advantageously, the print server 110 and the virtual printer 130 enable any print job to be seeded for purposes of testing the PVS 150 and not just a specially prepared job. A print operator can thus be assured the PVS 150 is able to detect defects in a print job before actual production copies are printed, thus enabling the print operator to authorize new book formats even if the PVS 150 has not previously encountered the format. Additionally, the print server 110 and the virtual printer 130 enable testing of the PVS 150 without reformatting a print job into page pairs, eliminating the need for the PVS 150 to be switched to a test mode to perform this verification, and more accurately reflecting normal operation of the PVS 150 in which each printed page is compared against a rasterized version of the same page.

The print server 110 may include an interface 112, graphical user interface (GUI) 113, test job controller 114, and memory 115. The interface 112 is configured to receive/send print jobs. The GUI 113 enables user input to the print system 100 and/or display of various characteristics of the print system 100 to the user. For example, the user may create or edit print jobs at the print server 110 using the GUI 113. The test job controller 114 initiates a verification process of the PVS 150. In particular, the test job controller 114 is configured to generate multiple versions of a given print job including a defective print job 116 and a non-defective print job 118. The defective print job 116 and non-defective print job 118 may be temporarily stored in memory 115 before being sent to the printer 120 and virtual printer 130 in some combination, as described in greater detail below.

The virtual printer 130 is similarly operable as the printer 120 in generating rasterized images for print jobs but excludes print engines and is thus without any physical marking ability. The virtual printer 130 may include an interface 132 to receive/send print jobs and print data, and a print controller simulator 134 to generate rasterized image data for a print job. The interfaces described herein (e.g., interfaces 112/122/132/152) may include any combination of devices or components (e.g., an Ethernet interface, wireless interface, etc.) operable to receive/transmit data between various elements of the print system 100 and/or various external elements. Additionally, although elements of the print system 100 may be shown and described as separate components for purposes of discussion, various combinations of elements may be at least partially integrated together or be considered to form a common entity. For example, components or functions of the print server 110 may be considered a part of the PVS 150. Illustrative details of the operation of the print system 100 will be discussed in the flowcharts below.

Figure 2:
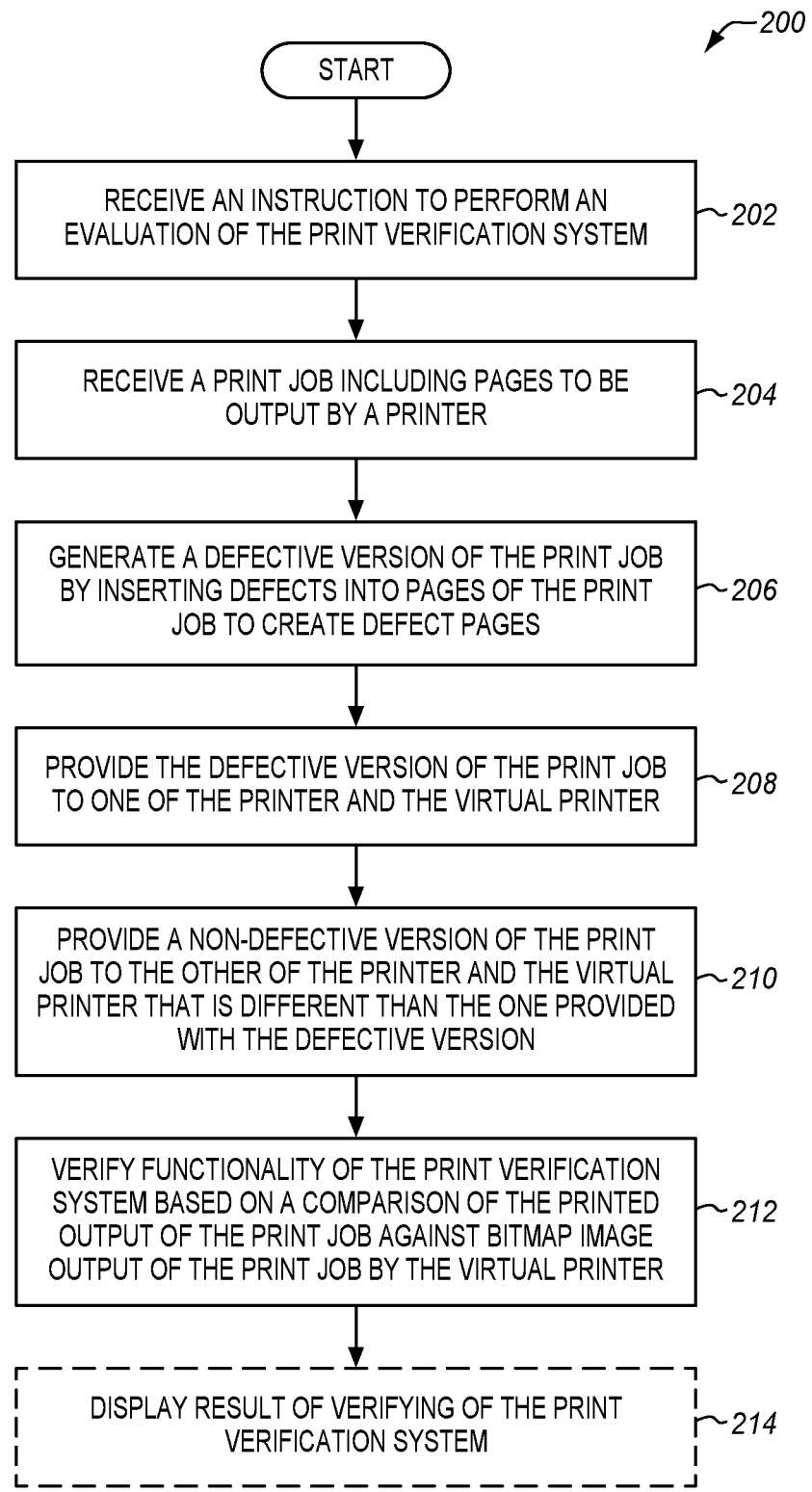
FIG. 2 is a flowchart illustrating a method of evaluating a print verification system an illustrative embodiment.

FIG. 2 is a flowchart illustrating a method 200 of evaluating the PVS 150 an illustrative embodiment. The steps of method 200 are described with reference to the print system 100 but those skilled in the art will appreciate that method 200 may be performed in other systems. The steps of the flowcharts described herein are not all inclusive and may include other steps not shown. The steps described herein may also be performed in an alternative order.

In step 202, the print server 110 receives an instruction to perform an evaluation of the PVS 150. For example, a user may input commands via GUI 113 to designate a stored print job or incoming print job for testing the PVS 150. In step 204, the print server 110 receives a print job including pages to be output by the printer 120. In step 206, the print server 110 generates a defective version of the print job by inserting defects into pages of the print job to create defect pages.

In step 208, the print server 110 provides the defective version of the print job to one of the printer 120 and the virtual printer 130. In step 210, the print server 110 provides a non-defective version of the print job to the other of the printer 120 and the virtual printer 130 that is different than the one provided with the defective version. For example, if the printer 120 receives the defective version, then the virtual printer 130 receives the non-defective version, and vice versa. In step 212, the print server 110 verifies the functionality of the PVS 150 based on a comparison of the printed output of the print job against the bitmap image output of the print job by the virtual printer 130. In other words, the PVS 150 is tested based on its detection of any differences between the output of the printer 120 and the output of the virtual printer 130.

In optional step 214, the print server 110 displays the result of verifying the PVS 150. For example, if differences are found in step 212, the print server 110 may direct the GUI 113 to display the type, location, and/or rate of detected defects. In one embodiment, the print server 110 generates a defect detection percentage based on a comparison of the printed output of the print job by the printer 120 against bitmap image output of the print job by the virtual printer 130. Accordingly, in using method 200, any print job can be seeded for purposes of testing the PVS 150 and not just a specially prepared job. Additionally, testing of the PVS 150 is enabled without reformatting a print job into page pairs, eliminating the need for the PVS 150 to be switched to a test mode to perform this verification, and more accurately reflecting normal operation of the PVS 150 in which each printed page is compared against a rasterized version of the same page.

Figure 3:
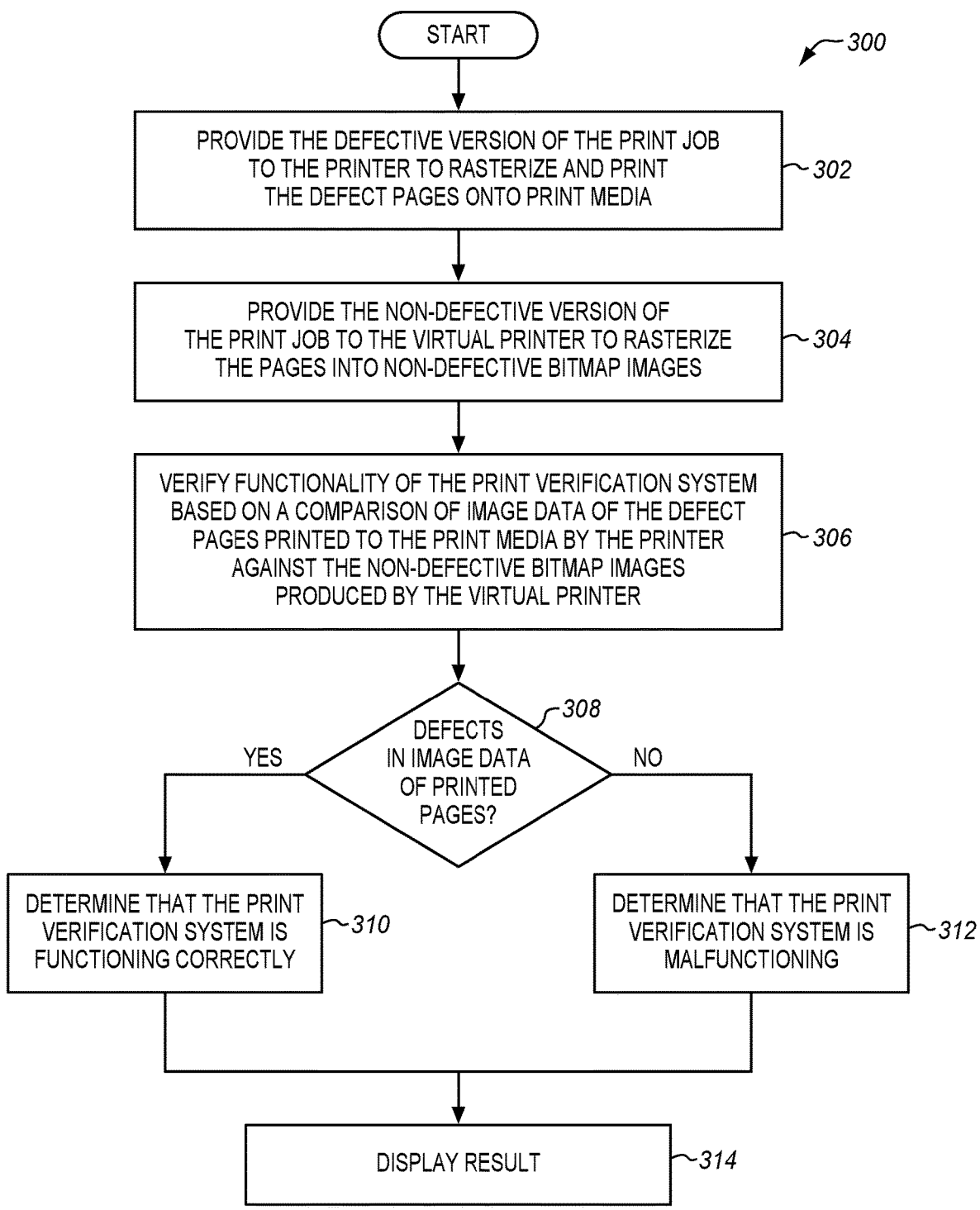
FIG. 3 is a flowchart illustrating a method of evaluating a print verification system in another illustrative embodiment.

FIG. 3 is a flowchart illustrating a method 300 of evaluating the PVS 150 in another illustrative embodiment. In step 302, the print server 110 provides the defective version of the print job to the printer 120 to rasterize and print the defect pages onto print media. In step 304, the print server 110 provides the non-defective version of the print job to the virtual printer 130 to rasterize the pages into non-defective bitmap images. In step 306, the print server 110 verifies the functionality of the PVS 150 based on a comparison of image data of the defect pages printed to the print media by the printer 120 against the non-defective bitmap images produced by the virtual printer 130.

In step 308, the print server 110 determines whether the PVS 150 detects defects in the image data of printed pages. If so, (Yes in step 308), the method 300 proceeds to step 310 and the print server 110 determines that the PVS 150 is functioning correctly. Otherwise, the method 300 proceeds to step 312 and the print server 110 determines that the PVS 150 is malfunctioning. In step 314, the print server 110 displays the result. For example, the GUI 113 may display confirmation that the PVS 150 is accurately detecting errors or display a message indicating characteristics of errors not being picked up by the PVS 150 depending on the result of the test.

Figure 4:
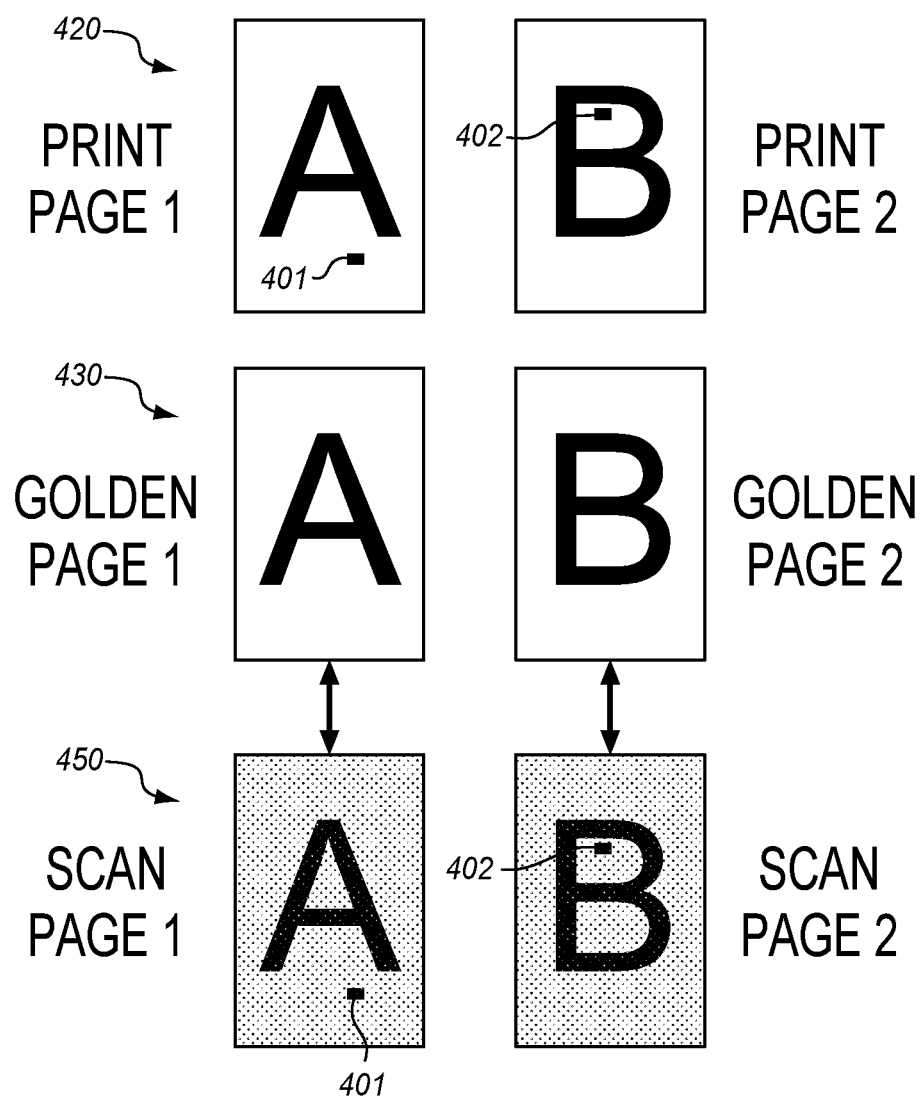
FIG. 4 shows an example of seeding a print job to be sent to the printer in an illustrative embodiment.

FIG. 4 shows an example of seeding a print job to be sent to the printer 120 in an illustrative embodiment. In this example, the print server 110 generates a defective print job 420 to be sent to the printer 120 by inserting seeded defects 401-402 in pages of the print job. Additionally, the print server 110 provides, to the virtual printer 130, a non-defective print job 430 representing ideal images, sometimes referred to as golden images, of the same print job. Here, the defective print job 420 is printed to print media by the printer 120. Accordingly, the PVS 150 obtains image data 450 of the pages of the defective print job 420 printed on the print media. In this example, the PVS 150 detects the seeded defects 401-402 by comparing the image data 450 of the pages of the defective print job 420 to the non-defective print job 430 rasterized by the virtual printer 130. Here, the PVS 150 detects unintentional black defects for seeded black defects and missing black defects for seeded white defects which more closely matches actual production processing by the PVS 150 compared to prior techniques. Additionally, the functionality of the PVS 150 may be verified without reformatting the original print job into page pairs (e.g., page 1 and page 2 can be different as shown in FIG. 4). Furthermore, an operator may verify the PVS 150 using any print job and any printer as earlier described.

Figure 5:
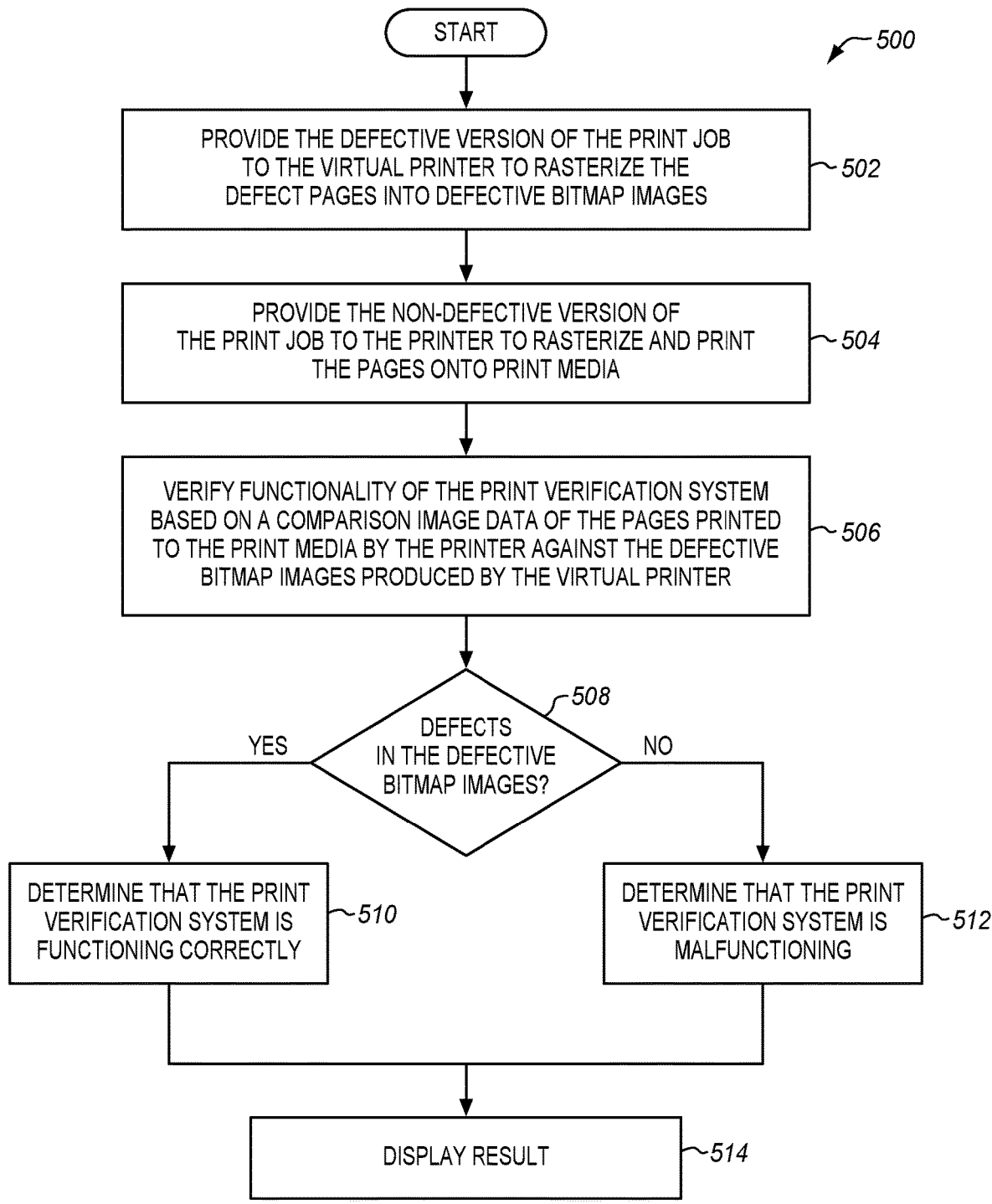
FIG. 5 is a flowchart illustrating a method of evaluating a print verification system in yet another illustrative embodiment.

FIG. 5 is a flowchart illustrating a method 500 of evaluating the PVS 150 in yet another illustrative embodiment. The method 500 is similar to the method 300 previously described except that the arrangement of which version of the print job is provided to the printer 120 and virtual printer 130 is switched. In step 502, the print server 110 provides the defective version of the print job to the virtual printer 130 to rasterize the defect pages into defective bitmap images. In step 504, the print server 110 provides the non-defective version of the print job to the printer 120 to rasterize and print the pages onto print media.

In step 506, the print server 110 verifies the functionality of the PVS 150 based on a comparison of image data of the pages printed to the print media by the printer 120 against the defective bitmap images produced by the virtual printer 130. In step 508, the print server 110 determines whether the PVS 150 detects defects in the defective bitmap images produced by the virtual printer 130. If so, (Yes in step 508), the method 500 proceeds to step 510 and the print server 110 determines that the PVS 150 is functioning correctly. Otherwise, the method 500 proceeds to step 512 and the print server 110 determines that the PVS 150 is malfunctioning. In step 514, the print server 110 may display the result. Accordingly, one or both of methods 300 and 500 may be performed with the print system 100 to test the accuracy of the PVS 150 in an improved manner.

Figure 6:
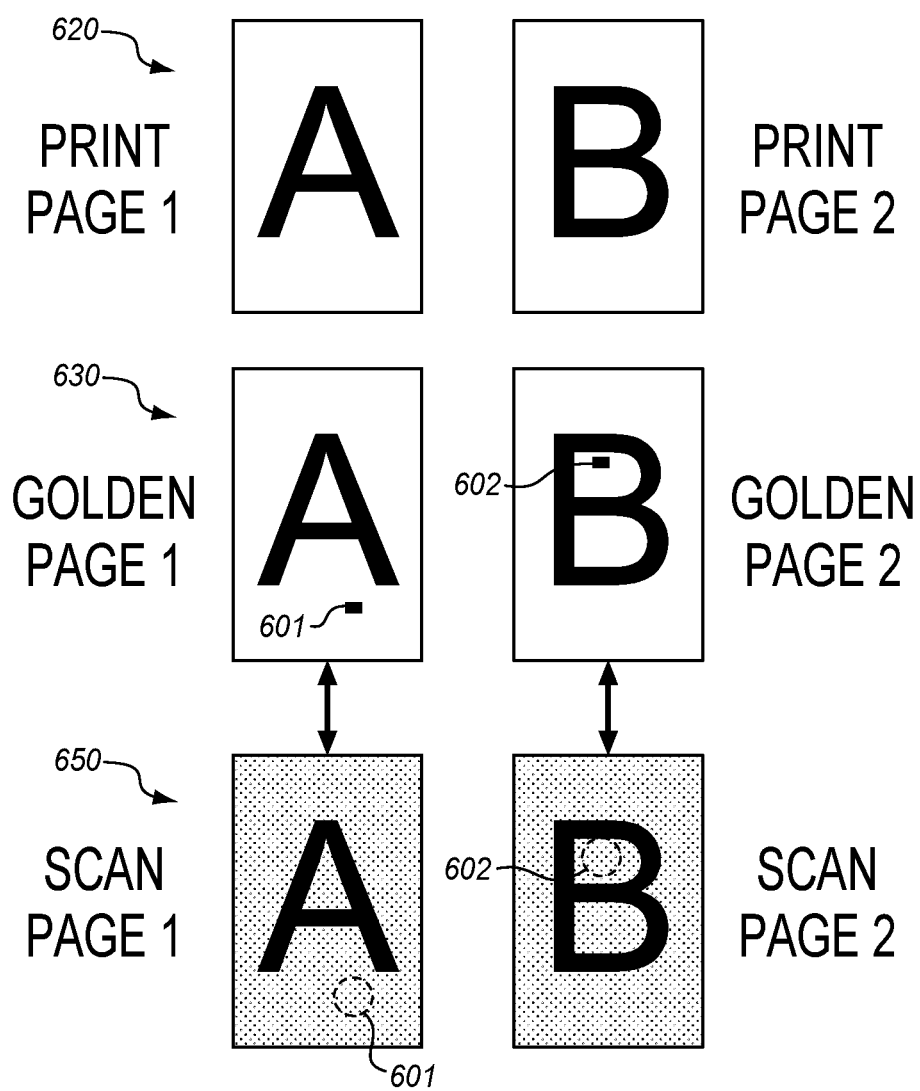
FIG. 6 shows an example of seeding a golden image job to be sent to the virtual printer in an illustrative embodiment.

FIG. 6 shows an example of seeding a golden image job to be sent to the virtual printer 130 in an illustrative embodiment. In this example, the print server 110 generates a defective print job 630 to be sent to the virtual printer 130 by inserting seeded defects 601-602 in pages of the print job to be rasterized by the virtual printer 130. Additionally, the print server 110 provides, to the printer 120, a non-defective print job 620 to the printer 120. Accordingly, the PVS 150 obtains image data 650 of the pages of the non-defective print job 620. By comparing the image data 650 to the rasterized output of the defective print job 630, the PVS 150 may detect the seeded defects 601-602 of the golden image job, as indicated by the circled areas with dashed lines in the image data 650. In particular, the PVS 150 detects missing black defects for seeded black defects and unintentional black for seeded white defects. Accordingly, the same seeds may be present for all copies of a book. Thus, the functionality of the PVS 150 may be verified by additional or alternatively seeding defects in a print job that is sent to the virtual printer 130 and not the printer 120.

Figure 7:
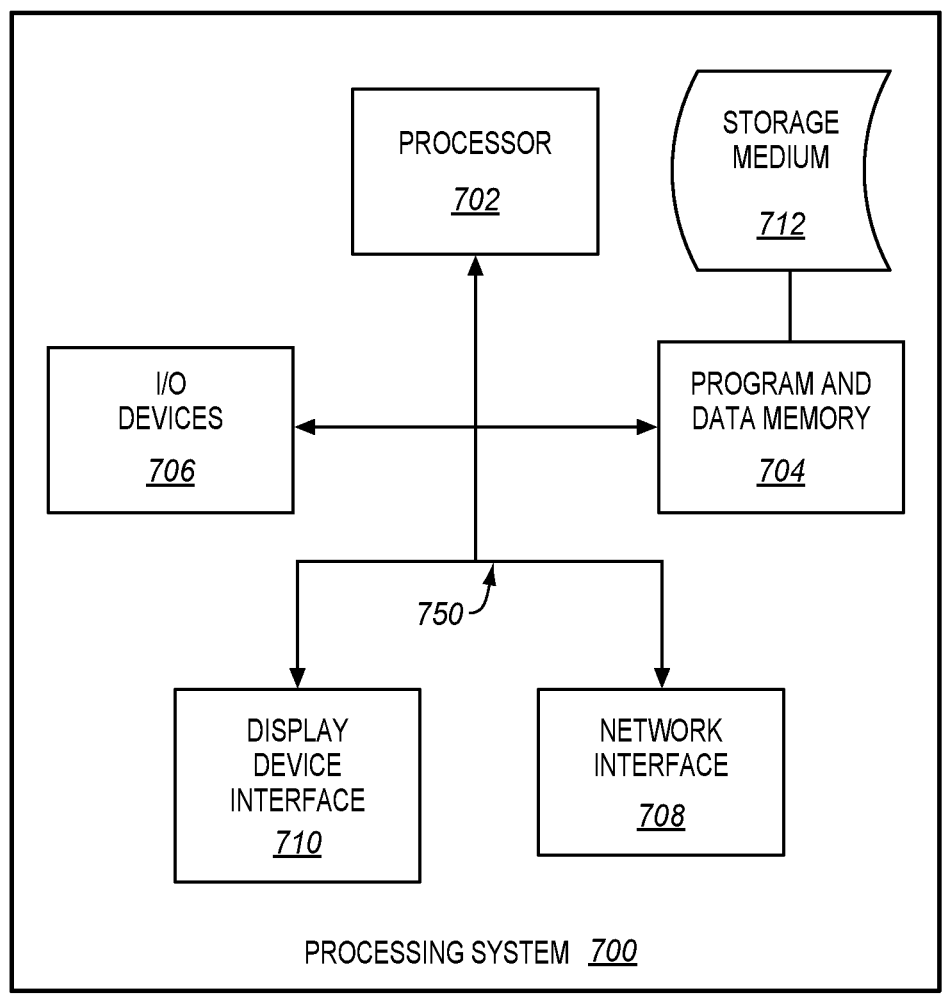
FIG. 7 illustrates a processing system operable to execute a computer readable medium embodying programmed instructions to perform desired functions in an illustrative embodiment.

FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A print system comprising:
a printer configured to rasterize print jobs to produce first rasterized images, and to mark print media according to the first rasterized images to produce printed output;
a virtual printer configured to rasterize print jobs to produce second rasterized images, and to output the second rasterized images as bitmap image output;
a print verification system configured to detect print errors by comparing the first rasterized images and the printed output; and
a print server configured to receive an instruction to perform an evaluation of the print verification system, to receive a print job including pages to be output by the printer, and to generate a defective version of the print job by inserting defects into pages of the print job to create defect pages,
the print server further configured to provide the defective version of the print job to one of the printer and the virtual printer, to provide a non-defective version of the print job to another of the printer and the virtual printer that is different than the one which received the defective version, and to verify functionality of the print verification system based on whether the print verification system detects the defects via a comparison of the printed output of the print job by the printer against the bitmap image output of the print job by the virtual printer.

2. The print system of claim 1 wherein:
the print server is configured to provide the defective version of the print job to the printer to rasterize and print the defect pages onto the print media, to provide the non-defective version of the print job to the virtual printer to rasterize the pages into non-defective bitmap images, and to verify functionality of the print verification system based on detection of the defects by comparing image data of the defect pages printed to the print media by the printer against the non-defective bitmap images produced by the virtual printer.

3. The print system of claim 2 wherein:
the print server is configured, in response to the print verification system detecting the defects in the image data of the defect pages printed to the print media by the printer, to determine that the print verification system is functioning correctly, and
the print server is configured, in response to the print verification system not detecting one or more of the defects in the image data of the defect pages printed to the print media by the printer, to determine that the print verification system is malfunctioning.

4. The print system of claim 1 wherein:
the print server is configured to provide the defective version of the print job to the virtual printer to rasterize the defect pages into defective bitmap images, to provide the non-defective version of the print job to the printer to rasterize and print the pages onto the print media, and to verify functionality of the print verification system based on detection of the defects by comparing image data of the pages printed to the print media by the printer against the defective bitmap images produced by the virtual printer.

5. The print system of claim 4 wherein:
the print server is configured, in response to the print verification system detecting the defects in defective bitmap images produced by the virtual printer, to determine that the print verification system is functioning correctly, and
the print server is configured, in response to the print verification system not detecting one or more of the defects in the defective bitmap images produced by the virtual printer, to determine that the print verification system is malfunctioning.

6. The print system of claim 1 further comprising:
a display configured to display a result of verifying functionality of the print verification system.

7. The print system of claim 1 further comprising:
a print engine to physically mark the print media.

8. A method of evaluating a print verification system, the method comprising:
receiving an instruction to perform an evaluation of the print verification system;

receiving a print job including pages to be output by a printer;
generating a defective version of the print job by inserting defects into pages of the print job to create defect pages;
providing the defective version of the print job to one of the printer and a virtual printer;
providing a non-defective version of the print job to another of the printer and the virtual printer that is different than the one which received the defective version; and
verifying functionality of the print verification system based on whether the print verification system detects the defects via comparison of printed output of the print job by the printer against bitmap image output of the print job by the virtual printer.

9. The method of claim 8 further comprising:
providing the defective version of the print job to the printer to rasterize and print the defect pages onto print media;
providing the non-defective version of the print job to the virtual printer to rasterize the pages into non-defective bitmap images; and
verifying functionality of the print verification system based on detection of the defects by comparing image data of the defect pages printed to the print media by the printer against the non-defective bitmap images produced by the virtual printer.

10. The method of claim 9 further comprising:
in response to the print verification system detecting the defects in the image data of the defect pages printed to the print media by the printer, determining that the print verification system is functioning correctly; and
in response to the print verification system not detecting one or more of the defects in the image data of the defect pages printed to the print media by the printer, determining that the print verification system is malfunctioning.

11. The method of claim 8 further comprising:
providing the defective version of the print job to the virtual printer to rasterize the defect pages into defective bitmap images;
providing the non-defective version of the print job to the printer to rasterize and print the pages onto print media; and
verifying functionality of the print verification system based on detection of the defects by comparing image data of the pages printed to the print media by the printer against the defective bitmap images produced by the virtual printer.

12. The method of claim 11 further comprising:
in response to the print verification system detecting the defects in the defective bitmap images produced by the virtual printer, determining that the print verification system is functioning correctly; and
in response to the print verification system not detecting one or more of the defects in the defective bitmap images produced by the virtual printer, determining that the print verification system is malfunctioning.

13. The method of claim 8 further comprising:
displaying a result of the verifying of the print verification system.

14. A non-transitory computer readable medium including programmed instructions which, when executed by a processor, are operable for performing a method of evaluating a print verification system, the method comprising:
receiving an instruction to perform an evaluation of the print verification system;
receiving a print job including pages to be output by a printer;
generating a defective version of the print job by inserting defects into pages of the print job to create defect pages;
providing the defective version of the print job to one of the printer and a virtual printer;
providing a non-defective version of the print job to another of the printer and the virtual printer that is different than the one which received the defective version; and
verifying functionality of the print verification system based on whether the print verification system detects the defects via comparison of printed output of the print job by the printer against bitmap image output of the print job by the virtual printer.

15. The computer readable medium of claim 14 wherein the method further comprises:
providing the defective version of the print job to the printer to rasterize and print the defect pages onto print media;
providing the non-defective version of the print job to the virtual printer to rasterize the pages into non-defective bitmap images; and
verifying functionality of the print verification system based on detection of the defects by comparing image data of the defect pages printed to the print media by the printer against the non-defective bitmap images produced by the virtual printer.

16. The computer readable medium of claim 15 wherein the method further comprises:
in response to the print verification system detecting the defects in the image data of the defect pages printed to the print media by the printer, determining that the print verification system is functioning correctly; and
in response to the print verification system not detecting one or more of the defects in the image data of the defect pages printed to the print media by the printer, determining that the print verification system is malfunctioning.

17. The computer readable medium of claim 14 wherein the method further comprises:
providing the defective version of the print job to the virtual printer to rasterize the defect pages into defective bitmap images;
providing the non-defective version of the print job to the printer to rasterize and print the pages onto print media; and
verifying functionality of the print verification system based on detection of the defects by comparing image data of the pages printed to the print media by the printer against the defective bitmap images produced by the virtual printer.

18. The computer readable medium of claim 17 wherein the method further comprises:
in response to the print verification system detecting the defects in the defective bitmap images produced by the virtual printer, determining that the print verification system is functioning correctly; and
in response to the print verification system not detecting one or more of the defects in the defective bitmap images produced by the virtual printer, determining that the print verification system is malfunctioning.

19. The computer readable medium of claim 14 wherein the method further comprises:

generating a defect detection percentage based on a comparison of the printed output of the print job by the printer against the bitmap image output of the print job by the virtual printer.

20. The computer readable medium of claim 14 wherein the method further comprises:

displaying a result of the verifying of the print verification system.

* * * * *